(12) United States Patent
Adury

(10) Patent No.: US 11,681,334 B2
(45) Date of Patent: Jun. 20, 2023

(54) LOW PROFILE FRICTION HINGE

(71) Applicant: Microsoft Technology Licensing, LLC, Redmond, WA (US)

(72) Inventor: Kashyap Adury, Bellevue, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 17/363,995

(22) Filed: Jun. 30, 2021

(65) Prior Publication Data

US 2023/0004196 A1 Jan. 5, 2023

(51) Int. Cl.
*G06F 1/16* (2006.01)

(52) U.S. Cl.
CPC .......... *G06F 1/1681* (2013.01); *G06F 1/1616* (2013.01)

(58) Field of Classification Search
CPC .............................. G06F 1/1681; G06F 1/1616
See application file for complete search history.

(56) References Cited

U.S. PATENT DOCUMENTS

| | | | | |
|---|---|---|---|---|
| 9,848,502 B1 * | 12/2017 | Chu | ....................... | G06F 1/1681 |
| 9,874,906 B1 * | 1/2018 | Hsu | ....................... | G06F 1/1641 |
| 10,274,996 B2 * | 4/2019 | Lin | ........................... | E05D 3/06 |
| 10,575,415 B2 * | 2/2020 | Shin | ....................... | G06F 1/1643 |
| 10,599,189 B1 * | 3/2020 | Hsu | ....................... | G06F 1/1681 |
| 10,754,395 B2 * | 8/2020 | Sanchez | ............... | H05K 5/0086 |
| 10,921,863 B2 | 2/2021 | Gault et al. | | |
| 11,054,869 B2 * | 7/2021 | Moon | .................... | G06F 1/1656 |
| 2014/0098474 A1 | 4/2014 | Bhowmik et al. | | |
| 2018/0210512 A1 * | 7/2018 | Lin | ........................... | E05F 5/08 |
| 2019/0090364 A1 * | 3/2019 | Shin | ...................... | H05K 5/0017 |
| 2020/0133350 A1 | 4/2020 | Gault et al. | | |
| 2020/0196461 A1 * | 6/2020 | Shin | ....................... | G06F 1/1681 |
| 2020/0233466 A1 * | 7/2020 | Sanchez | ............... | H05K 5/0017 |
| 2021/0116975 A1 * | 4/2021 | Moon | ................... | G06F 1/1652 |
| 2021/0191475 A1 | 6/2021 | Park et al. | | |
| 2021/0247815 A1 * | 8/2021 | Shim | ..................... | H04M 1/022 |
| 2021/0294390 A1 * | 9/2021 | Moon | ................... | G06F 1/1681 |

OTHER PUBLICATIONS

"International Search Report and Written Opinion Issued in PCT Application No. PCT/US22/030162", dated Sep. 1, 2022, 11 Pages.

* cited by examiner

*Primary Examiner* — Anthony M Haughton
*Assistant Examiner* — Theron S Milliser
(74) *Attorney, Agent, or Firm* — Holzer Patel Drennan

(57) ABSTRACT

The described technology provides a hinge device including a band including a first band end coupled by a slidable rotatable coupling to a first panel and a second band end coupled by a rotatable coupling to a part of a central support section and a different band including a first different band end coupled by a different slidable rotatable coupling to a second panel and a second different band end coupled by a different rotatable coupling to a different part of the central support section, wherein the central support section is configured to rotate around a virtual pivot axis parallel to each of the first panel and the second panel and located outside a surface plane of each of the first panel and the second panel.

20 Claims, 7 Drawing Sheets

LOW PROFILE FRICTION HINGE

BACKGROUND

Computing devices are often configured to open and close about a hinge. This function can allow exposure of delicate or sensitive elements of a computing device only when the sensitive items are being used and not when the computing device is stored. Different hinges allow different extents of movement of elements relative to one another in the computing devices. Hinges can also be used for kickstands or other support elements to facilitate support under some circumstances.

SUMMARY

The described technology provides a hinge device including a band including a first band end coupled by a slidable rotatable coupling to a first panel and a second band end coupled by a rotatable coupling to a part of a central support section and a different band including a first different band end coupled by a different slidable rotatable coupling to a second panel and a second different band end coupled by a different rotatable coupling to a different part of the central support section, wherein the central support section is configured to rotate around a virtual pivot axis parallel to each of the first panel and the second panel and located outside a surface plane of each of the first panel and the second panel.

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Other implementations are also described and recited herein.

BRIEF DESCRIPTIONS OF THE DRAWINGS

DETAILED DESCRIPTIONS

Computing devices are often optimized for mobility. Some mobile computing devices such as laptops or hybrid 2-in-1 tablet-laptop systems have elements that are foldable at a hinge to allow for switching between configurations for use and storage. In implementations, the closeable nature of the computing device protects certain interior elements of the computing device. In implementations in which the computing device has a kickstand or other support, a similar hinge may be used.

A trend in mobile device development has been towards reducing the size and/or thickness of mobile devices. The presence of a hinge can limit the minimum thickness of a mobile computing device. For example, in some systems, the hinge has elements between panels that are meant to rotate about the hinge. This can require a gap as thick as the hinge separating the two surfaces of the panels. Further, the thickness of a hinge itself may be greater than either of the two panels, making the requisite thickness greater than that of the combined panels. Making portions of the hinge largely recessed within the panels themselves may reduce the overall thickness of the mobile device.

In mobile computing devices, having a panel rotate with respect to another panel about an axis within a hinge or within one of the panels may limit the range of rotation of the panels relative to one another. In one implementation, a hinge that creates a virtual pivot axis outside of the hinge and/or the panels can allow for folding to an extent that the panels can have surfaces that touch one another (such as by having surface panels that touch one another) in a closed configuration.

Hinged elements of computing devices can provide friction at certain axes and positions to allow for multiple adjustable and fixable positions of panels relative to one another. For example, the panels coupled about the hinge which rotate relative to one another may be positionable at certain angles relative to one another, and frictional rotatable couplings (e.g., ones using friction pins within couplings) can maintain that position until sufficient force is supplied to change the relative positions of the panels. Using more than one friction pin can improve the range of angles over which the panels can be fixed in positions relative to one another.

The technology disclosed herein may solve technical problems associated with providing a hinge with a wide range of rotation angles in a small device. The disclosed features function independently and/or in synergistic cooperation to solve the technical problems. For example, using, without limitation, one or more of conformal elements, motion of multiple components that can share dimensional space in certain configurations, and a virtual pivot axis of rotation of components may provide the wide range of hinge rotation in a small form factor.

Figure 1A:
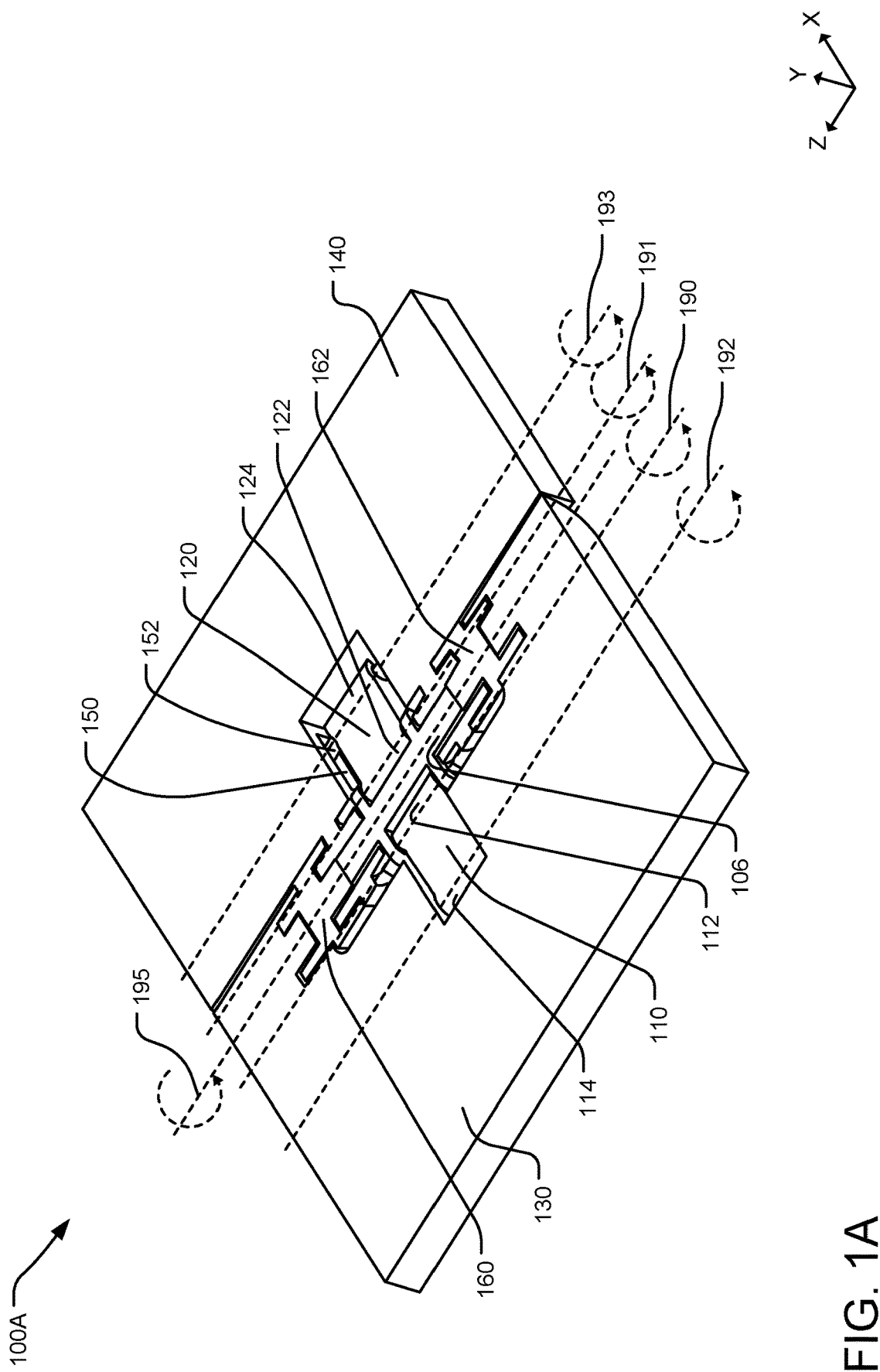
FIG. 1A illustrates a front view of an example hinge device system in an open configuration.
Figure 1B:
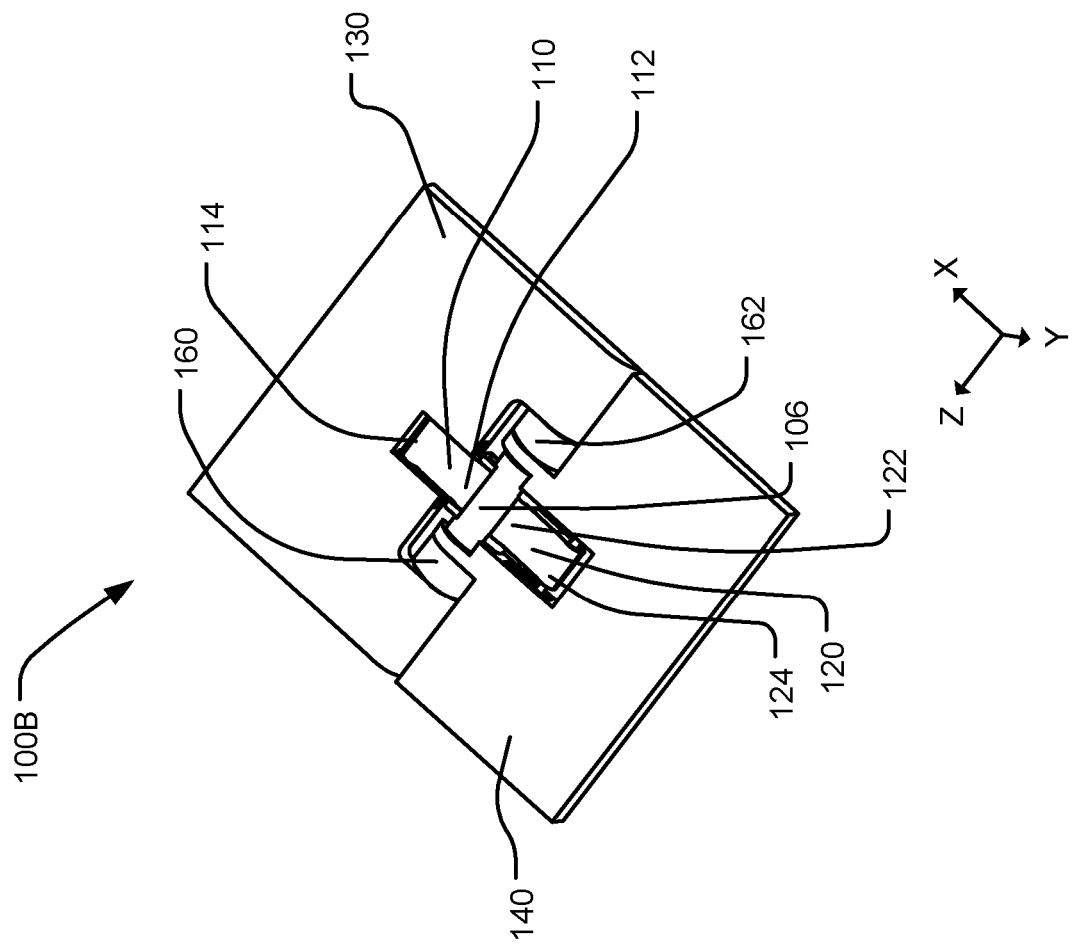
FIG. 1B illustrates a rear view of an example hinge device system in an open configuration.

FIGS. 1A and 1B illustrate an elevated view of an example hinge device system 100A, 100B in an open configuration. Specifically, FIG. 1A illustrates a front view of an example hinge device system 100A in an open configuration. FIG. 1B illustrates a rear view of an example hinge device system 100B in an open configuration. Hinge device system 100B may be a reverse view of hinge device system 100B. The hinge device system 100A may be from a perspective looking at a portion of the hinge device system 100A, 100B with surfaces upon which the hinge device system 100A, 100B closes. The hinge device system 100B is from a perspective of an opposite side of the hinge device system 100A, 100B relative to the hinge device system 100A. The hinge device system 100B illustrates elements that may potentially be visible whether the hinge device system 100B is in an open or closed configuration. In the illustrated implementations, reference axes labeled "X," "Y," and "Z," are provided to demonstrate a relative orientation of elements.

The hinge device system 100A, 100B includes a central support section 106 rotatably coupled to a first band 110 by a first rotatable coupling 112. The first band 110 may be further slidably coupled to a first panel 130 by a first slidable coupling 114. The central support section 106 may be coupled to a second band 120 by a second rotatable coupling 122. The second band 120 may be slidably coupled to a second panel 140 by a second slidable coupling 124.

The first and second rotatable couplings 112, 122 may each be formed by a pin that is coupled to two positions of the central support section 106 and runs through a pin receptacle. In implementations, the pins may be friction pins that provide resistance to rotation about the rotatable couplings 112, 122. The friction may be provided within the receptacle and/or may be provided by friction generated within one or more of the rotatable couplings 112, 122 to the positions on the central support section 106. The first and second rotatable couplings 112, 122 have rotational axes 190 and 191, respectively (for example defined by central axes of rotational pins). The rotational axes 190, 191 may be different from each other and/or different from a virtual pivot axis 195. A virtual pivot axis 195 is an axis of rotation that is outside of physical components and generated by movement of the multiple components. In an implementation, the central support section is adapted to rotate about the virtual pivot axis 195 based at least in part on cooperative motions associated with the rotatable couplings 112, 122 and the slidable couplings 114, 124. In various implementations, one or more of the first panel 130, the second panel 140, the central support 106, the first side support 160, and the second side support rotate about the virtual pivot axis 195, with one or more of them rotating about the virtual pivot axis 195 as a central axis of rotation.

The first and second slidable couplings 114, 124 may each include pins situated in receptacles of the first and second bands 110, 120, respectively, and slots 150 in the first and second panels 130, 140, respectively. Although only one slot 150 is visibly illustrated, there may be a same and an opposing slot within each of the slidable couplings 114, 124. The pins may be configured to rotate about elements that couple the pins to the slots. In the illustrations of hinge device system 100A, one slidable pin 154 is visible, but each of the first and second slidable couplings 114, 124, may have a slidable pin 154, and each of the rotatable couplings may have a rotatable pin 152. In an embodiment, the slidable pins 154 may also be rotatable. Correspondingly, in implementations, the slidable couplings 114, 124 may be further rotatable (e.g., slidable rotatable couplings) and have slidable rotational axes 192 and 193, respectively (for example, defined substantially by central axes of the slidable pins 154). The slidable rotational axes 192, 193 may be movable within the first panel 130 and second panel 140, respectively. The slidable rotational axes 192, 193 may be different from each other and/or different from the virtual pivot axis 195.

In an implementation, in an open configuration of the hinge device system 100A, 100B, the rotational axes 190, 191, the slidable rotational axes 192, 193, and the virtual pivot axis 195 may be substantially parallel to one another. In an implementation, the slidable rotational axes 192, 193 may both be in a plane parallel to a surface of the first panel 130. In an implementation. The rotational axes 190, 191 may be in a plane parallel to a surface of the first panel 130. In an implementation, the virtual pivot axis 195 may not be in a same plane parallel to a surface of the first panel 130 as any of rotational axes 190, 191 and slidable rotational axes 192, 193. For example, the virtual pivot axis 195 may be outside of the components of the hinge device system 100A, 100B when the hinge device system 100A, 100B is in an open configuration. The virtual pivot axis 195 may or may not be inside any physical component of the hinge device system 100A, 100B. In FIG. 1A, the virtual pivot axis 195 is illustrated as being above a surface of the first panel 130 and the second panel 140 (illustrated relative to other axes 190, 191, 192, and 193 which are shown as embedded within the first panel 130 and the second panel 140). The virtual pivot axis 195 being outside of the hinge device system 100A, 100B may facilitate a fuller relative rotation of panels 140 and 130 without interference from components. Also, it may facilitate a distance or gap between the panels 130, 140 to allow attachment of additional surface panels between the panels 130, 140 that can close on one another.

The hinge device system 100A, 100B further includes a first side support section 160 and a second side support section 162. The first side support section 160 may be on an opposite side of the central support section 106 relative to the second side support section 162. In one implementation, one or more of the first side support section 160 and the second side support section 162 are operable to couple the first panel 130 to the second panel 140 on opposing sides of the central support section 106 by slip fit. The first side support section 160 and the second side support section 162 may be adapted to rotate about the virtual pivot axis 195 and/or may be operable to control a rotation of the first panel 130 relative to the second panel 140 (or a first surface panel relative to a second surface panel) about the virtual pivot axis 195. In an implementation, the first side support section 160 and the second side support section 162 are not directly coupled to the central support section 106, which may allow for easier manufacturing of the hinge device system 100A, 100B. In an implementation, the first side support section 160 and the second side support section 162 are recessed below or substantially flush with a surface of one or more of the first panel 130 and the second panel 140.

Each of the first side support section 160 and the second side support section 162 may have elements that complementary portions to allow for a slip fit of the first side support section 160 and the second side support section 162 with one or more of the first panel 130 and the second panel 140. The complementary portions may have male and female complementary components to facilitate the slip fit coupling. In an implementation, the side support sections 160, 162 have proximal complementary components on sides proximal to the central support section 106 and have the same or different distal complementary components on sides distal from the central support section 106. In an implementation, the distal complementary portions couple the side support sections 160, 162 to the first panel 130, by slip fit. The proximal complementary portions may couple the side support sections 160, 162 to the second panel 140 by slip fit. In an implementation, the side support sections 160, 162 are coupled to the first panel 130 and the second panel 140 by plain bearing fittings. Slip fit couplings may synergistically provide advantages of a largely conformal coupling and guidance for rotation in a virtual pivot axis.

The proximal complementary portions may oppose the distal complementary components to prevent decoupling of the side support sections 160, 162 from the first panel 130 and the second panel 140. The distal complementary portions may include curved slots in one or more of the first panel 130 and the second panel 140 (e.g., panel conformal elements). One or more of the first panel 130 and the second panel 140 may have a central support section cradle for supporting the central support section 106. In an implementation, the central support section cradle may be substantially arcuate. Parts of the central support section cradle may also be a component of the proximal complementary portions, such as cradle conformal elements. For example, the side support sections 160, 162 may have elements that conform to a part of the central support section cradle that is adjacent to the central support section 106 and may surround the part of the central support section cradle. The complementary elements may include protrusions and complementary recesses that form tracks or channels that direct one or more of the central support section 106 and the side support sections 160, 162 to rotate substantially about the virtual pivot axis 195. Using complementary portions may reduce the thickness of the hinge device system 100A, 100B and may improve ease of manufacturing.

Portions of the central support section 106 and the side support sections 160, 162 may be hemicylindrical (or a sliced-cylinder or elliptically cylindrical) and/or conformal to a recessed portion of the interior of the central support section cradle. The term, sliced-cylinder is herein defined as a shape that is less than half of a cylinder that would result from cutting a majority of a cylinder away at a plane at a consistent radial position from the center of the cylinder along a length of the cylinder with the plane being parallel to a central axis of the cylinder (the central axis may be defined by the center of each circular cross-section of the cylinder). The central support section cradle may be conformally shaped to receive and/or may have a surface portion that in an open configuration of the hinge device system 100A, 100B is substantially flush with one or more of the central support section 106 and the side support sections 160, 162. This arrangement may provide a substantially flat substrate to which to couple surface panels. In implementations, the central support section cradle is composed of two parts on opposite sides of the central support section 106. In an implementation, the first and second slidable couplings 114, 124 may limit an extent to which the central support section 106 can rotate, preventing one or more of the first panel 130 and the second panel 140 from decoupling from the side support sections 160, 162 (e.g., by the one or more of the first panel 130 and the second panel 140 sliding out of a slip fit of complementary portions). In an implementation, one or more of the first side support section 160, second side support section 162, the first panel 130, and the second panel 140 have hard stops to prevent rotation of fitted couplings to the point that the fittings decouple. The illustrated implementation of the hinge device system 100A, 100B may be exaggerated for illustrative purposes and different relative proportions for component sizes and different relative orientations of components are contemplated.

Figure 2:
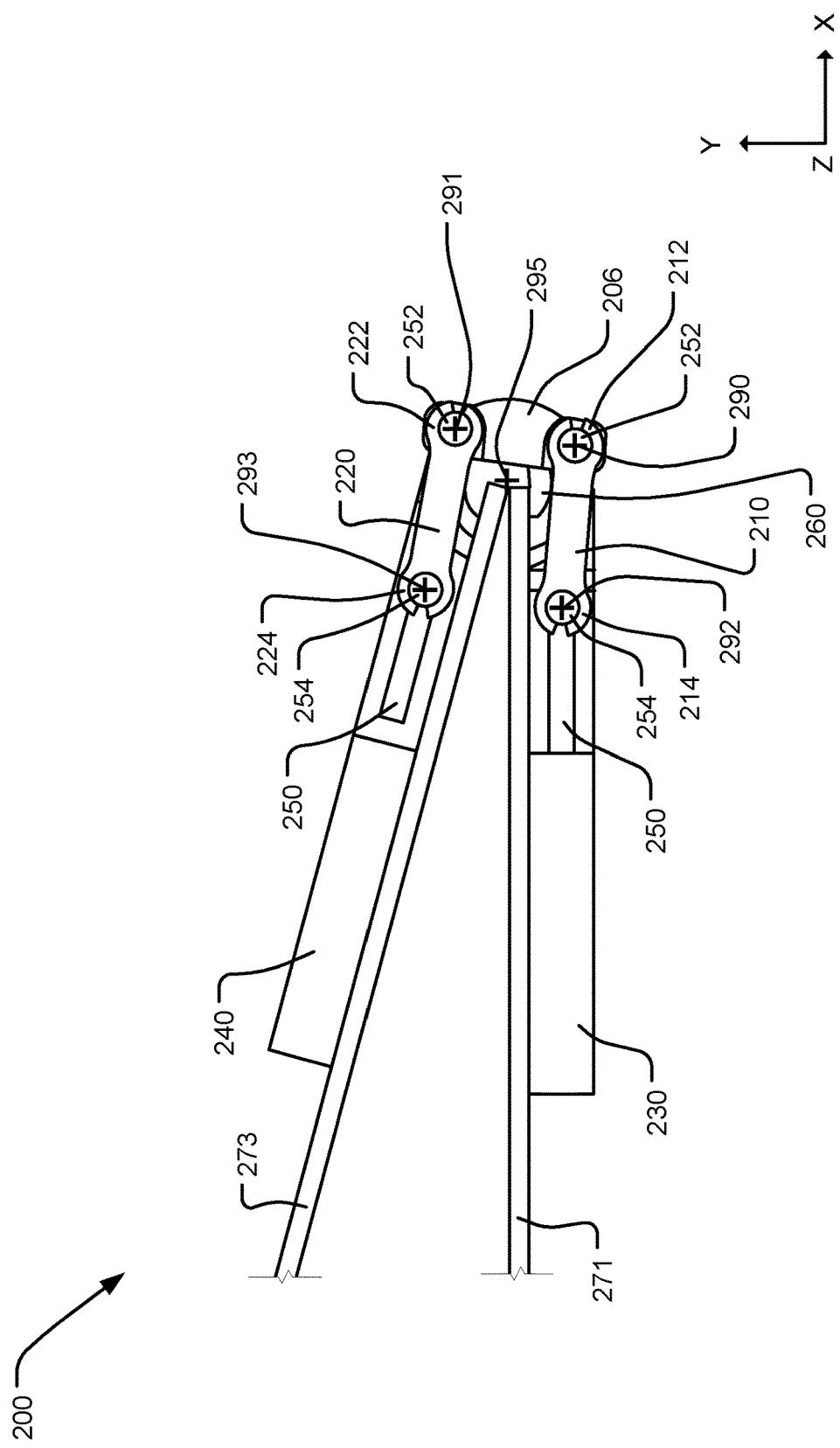
FIG. 2 illustrates a cross-sectional view of an example hinge device system with surface panels in an angled configuration.

FIG. 2 illustrates a cross-sectional view of an example hinge device system 200 with surface panels 271, 273 in an angled configuration. The cross-sectional view may be of a middle of the hinge device system 200 in the z-axis, as illustrated. A comparison of the implementations illustrated in FIG. 2 and FIG. 1 illustrates that surface panels 273, 271 can be accommodated by a gap between panels 230 and 240 when the hinge device system 200 closes. This gap may reflect a distance between rotatable couplings 212, 222 on a central support section 206. The distance may be substantially the same as or larger than a combined thickness of the surface panels 271, 273. Accounting for the gap in advance using this distance between rotatable couplings 212, 222 may allow for better conformity of hinge device system 200 components and allow for the hinge device system 200 to substantially close. The surface panels 271, 273 may be cosmetic panels to improve the appearance of the hinged elements or may be functional panels (e.g., elements of a stand). Implementations are contemplated where the range of rotation of a first panel 230 relative to a second panel 240 (or range of rotation of a first surface panel 271 relative to a second surface panel 273) is substantially one or more of 0°-180°, 0°-165°, 0°-135°, and 0°-90°. In an implementation, the central support section 206 moves independently of the side support sections (e.g., the illustrated first side support section 260) except as translated through the bands 210, 220 to the panels 230, 240 coupled to the side support sections.

As illustrated, a first band (or "a band") 210 is coupled by a slidable coupling 214 (e.g., a slidable rotatable coupling) to the first panel 230 at a first end of the first band 210 and is coupled by a rotatable coupling 212 to a part of a central support section 206 at a second end of the first band 210. A different band 220 is coupled by a different slidable coupling 224 (e.g., a different slidable rotatable coupling) to a second panel 240 at a first end of the different band 220 and is coupled by a different rotatable coupling 222 to a different part of the central support section 206 at a second end of the different band 220.

The hinge device system 200 illustrates positions of rotatable pins 252 and slidable pins 254 within rotatable couplings 212, 222 and slidable couplings 214, 224 respectively. One or more of the rotatable pins 252 and slidable pins 254 may be friction pins. For the purpose of this specification, friction pins are elements that provide resistance to a rotation of elements coupled to the pins about central axes of the pins. Implementations in which rotatable pins 252 are friction pins may benefit from resistance (whether consistent or varying over different rotational positions) provided throughout a range of rotation of panels 230, 240 (and/or surface panels 271, 273) relative to one another. This resistance may provide an ability to fix relative positions of panels 230, 240 (and/or surface panels 271, 273) until sufficient force is applied to move the first panel 230 relative to the second panel 240 (and/or the first surface panel 271 relative to the second surface panel 273). This functionality may be useful for a stand or support, as it may make the stand or support flexible to accommodate different positioning for that which is being supported by the supportive stand or other support. For example, one of the first panel 230 or second panel 240 or coupled surface panel could be coupled to a portion of a device with the other free to rotate away from the body of a device and provide a supportive leg. The functionality also may be useful for laptops or hybrid 2-in-1 tablet-laptop devices, as the monitor portion of the devices can be moved relative to another portion (e.g., a portion with a keyboard).

In implementations where slidable couplings 214, 224 are rotatable, the slidable pins 254 may also be friction pins, potentially providing further support at different fixable relative positions of the panels 230, 240 (and/or surface panels 271, 273). In implementations in which the slidable pins 254 are friction pins, the slidable pins 254 may be coupled to slots 250 by rotation-resistant elements that do not rotate within the slots 250 and provide resistance provided by the friction elements of the pin. For example, the elements may be of a shape that conforms to an interior shape of the slots 250 to prevent rotation of the elements within the slots 250 but allow sliding of the elements with the slidable pins 254. An example of this configuration is a slot 250 with an interior having parallel planar surfaces and coupling elements for the slidable pins 254 that are substantially rectangular prismatic or cubic in shape, such that the elements are conformal with the two parallel planes and cannot rotate within the slot 250. Rotation-resistant elements in couplings of slidable pins 254 to slots 250 may improve the ability to maintain a relative positioning of panels 230, 240.

The rotatable couplings 212, 222 may have rotational axes 290 and 291, respectively, which may be defined by central axes of rotational pins. The rotational axes 290, 291 may be different from each other and/or different from the virtual pivot axis 295. Correspondingly, in implementations, the slidable couplings 214, 224 may be further rotatable and have slidable rotational axes 292 and 293, respectively, for example defined substantially by central axes of the slidable pins 254.

The slidable rotational axes 292, 293 may be movable within the first panel 230 and second panel 240, respectively. The slidable rotational axes 292, 293 may be different from each other and/or different from the virtual pivot axis 295. In an angled configuration of the hinge device system 200, the rotational axes 290, 291, the slidable rotational axes 292, 293, and the virtual pivot axis 295 may be substantially parallel to one another. In an implementation, the slidable rotational axes 292, 293 may be in a plane that is not parallel to a surface of the first panel 230, such as when the hinge device system 200 is in a configuration other than an open configuration. In an implementation. The rotational axes 290, 291 may be in a plane that is not parallel to a surface of the first panel 230, such as when the hinge device system 200 is in a configuration other than an open configuration. In an implementation, the first slidable rotational axis 292 and the first rotational axis 290 may be in a plane that is not parallel to a surface of the first panel 230, when the hinge device system 200 is in an open configuration. The virtual pivot axis 295 may be parallel to a plane of each of the first panel 230 and the second panel 240 and/or may be located outside a surface plane of each of the first panel 230 and the second panel 240.

The virtual pivot axis 295 may be at or near an edge of one or more of the surface panels 271, 273. The virtual pivot axis 295 being outside of the panels 230, 240, allows a fuller relative rotation of panels 240 and 230 without interference from components. Also, the virtual pivot axis 295 may facilitate a gap between the panels 230, 240 to allow attachment of additional surface panels 271, 273 between the panels 230, 240.

In an implementation, the hinge device system 200 is an angled configuration that is not a closed configuration, such that the hinge device system 200 can close further, for example to an extent that the surface panels 271, 273 may be substantially adjacent (may even be touching) and substantially parallel to one another (and potentially substantially parallel to surfaces of the panels 230, 240). In another implementation, the angled configuration illustrated represents the furthest the hinge device system 200 can close (may be reflecting an angle in a range of 10°-20° between panels 230, 240 or between surface panels 271, 273). Not closing all of the way may be advantageous in situations where a support may be consistently needed and the angle of support may be adjusted.

Figure 3:
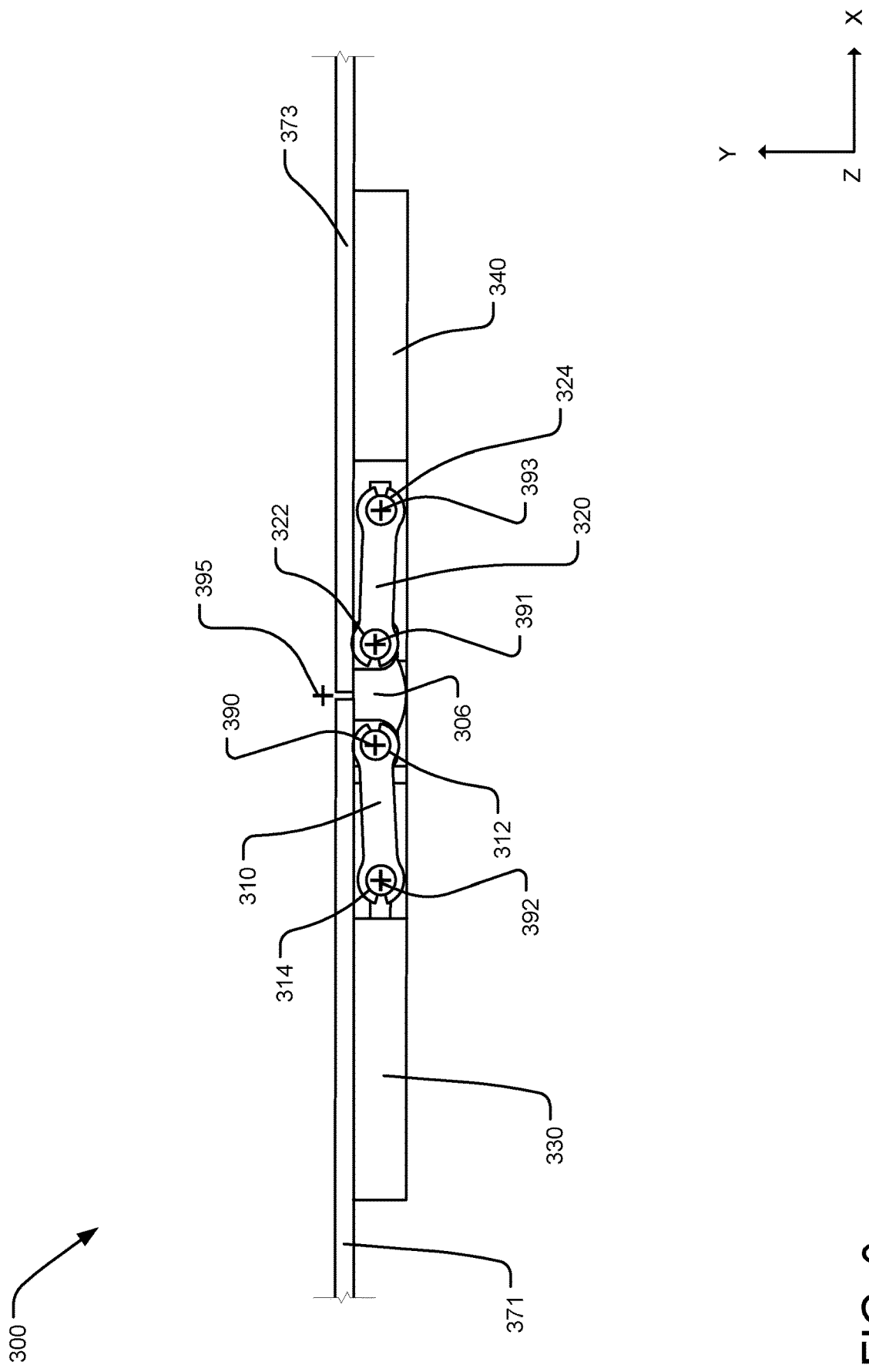
FIG. 3 illustrates a cross-sectional view of an example hinge device system with surface panels in an open configuration.

FIG. 3 illustrates a cross-sectional view of an example hinge device system 300 with surface panels 371, 373 in an open configuration. A comparison between hinge device system 300 of FIG. 3 and hinge device system 200 of FIG. 2 reveals that, in an implementation, the angled hinge device system 200 includes slidable couplings 214, 224 in positions in slots 250 more proximal or closer to the central support section 206 than slidable couplings 314, 324 in slots 350 relative to the central support section 306. When transitioning from an open configuration to an angled or closed configuration, the central support section 306 may be rotated within a central support section cradle with a rotatable coupling 312 pushed outwardly within the first panel 330, and it may cause the hinge device system 300 to elongate overall (e.g., adding the arc length of the exposed exterior of the central support section 306 to the length of the panels 330, 340). This overall elongation may provide synergistic advantages of a smaller size in an open configuration with conformal elements and a highly collapsible form in a closed configuration. As illustrated in FIG. 3, the hinge device system 300 in an open configuration has a virtual pivot axis 395 outside of the assembly of components of the hinge device system 300 (e.g., outside surfaces of the panels 330, 340). The extent to which the virtual pivot axis 395 is illustrated as outside of the hinge device system 300 may be exaggerated for purposes of illustration. For example, in an implementation, the virtual pivot axis 395 may be substantially in or close to a plane common with a surface of one or more of the surface panels 371, 373. Hinge device system 300 may further include arms 310, 320, rotatable couplings 312, 322, and axes 390, 391, 392, and 393.

Figure 4:
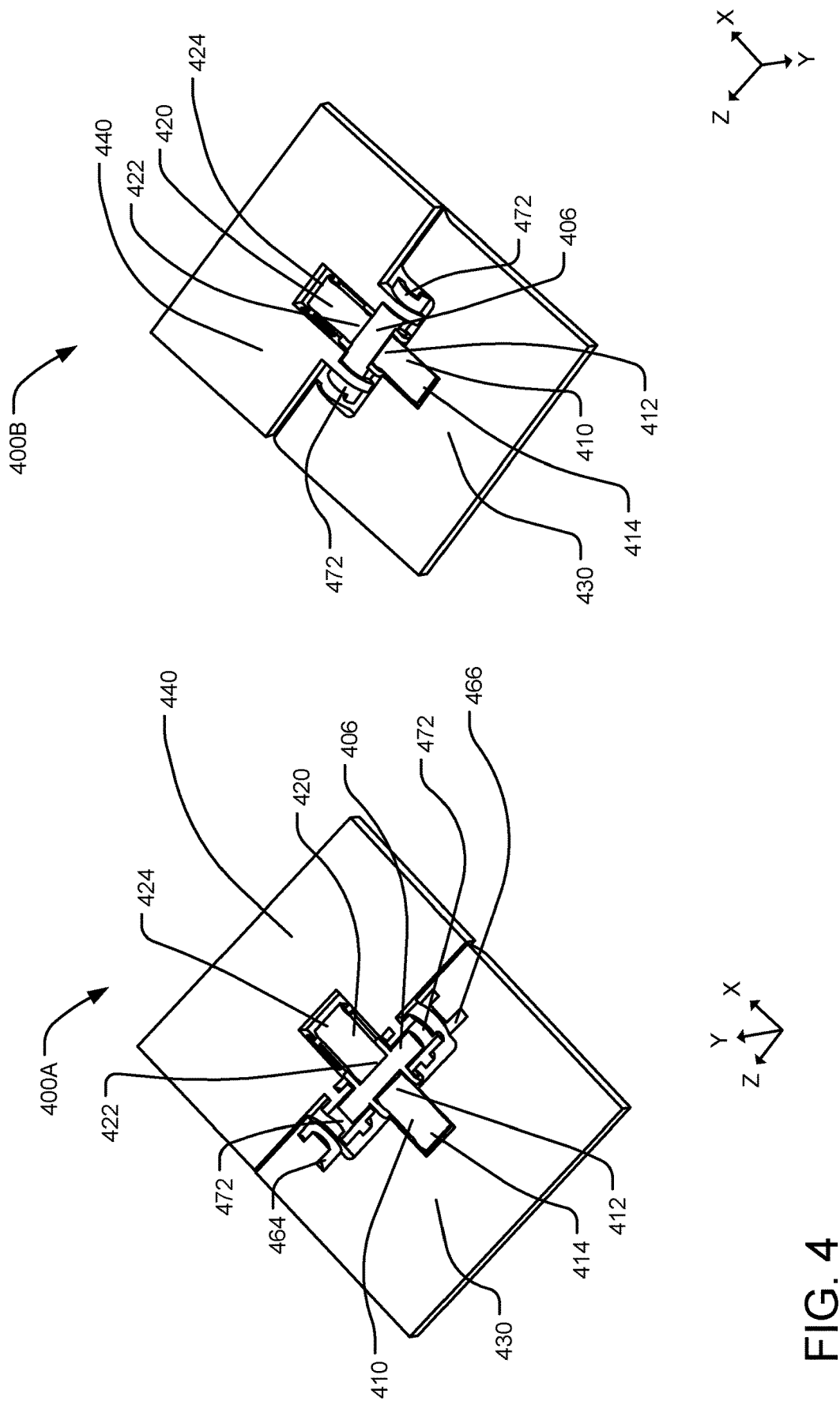
FIG. 4 illustrates an elevated view of an example hinge device system in an open configuration with omitted side support sections.

FIG. 4 illustrates an elevated view of an example hinge device system 400A, 400B in an open configuration with omitted side support sections. Hinge device system 400B is an illustration of a reverse view of hinge device system 400A. The hinge device system 400A, 400B may be provided to demonstrate relative arrangements of internal elements within the hinge device system 400A, 400B, but may or may not represent an implementation of the system itself. A central support section 406 rests in a central support section cradle 472. First channel 464 in a first panel 430 may receive a complementary portion of a first side support (not illustrated), and a complementary portion of the central support section cradle 472 of the second panel 440 may be received within a complementary portion of the first side support. The portions of the first channel 464 and the central support section cradle 472 may provide opposing elements to hold the first side support in a track defined by the complementary elements, for example, in a slip fit. Similarly, a second channel 466 in a first panel 430 may receive a complementary portion of a second side support (not illustrated), and a complementary portion of the central support section cradle 472 of the second panel 440 may be received within a complementary portion of the second side support. The portions of the first channel 464 and the central support section cradle 472 may provide opposing elements to hold the second side support in a track defined by the complementary elements, such as in a slip fit. These conformal fittings may simplify manufacturing and/or assembly, as the containing components can be prefabricated with them, likely reducing the need for additionally coupling steps.

The first panel 430 may be coupled to the second panel 440 via the coupling between the side portions and both of the central support section cradle 472 and the channels 464, 466. The first panel 430 may also be coupled to the second panel 440 via a coupling between the central support section 406 and the panels 430, 440 via arms 410, 420. Although the complementary elements that couple the side support sections and the central support section cradle 472 and channels 464 are illustrated as having certain protrusions and complementary recesses, implementations are considered in which the complementary elements are different, which may generate similar tracks in which side support components can slidably move and/or may provide for rotation about a virtual pivot axis 495. The hinge device system 400 may further include rotatable couplings 412, 422 and slidable couplings 414, 424.

Figure 5:
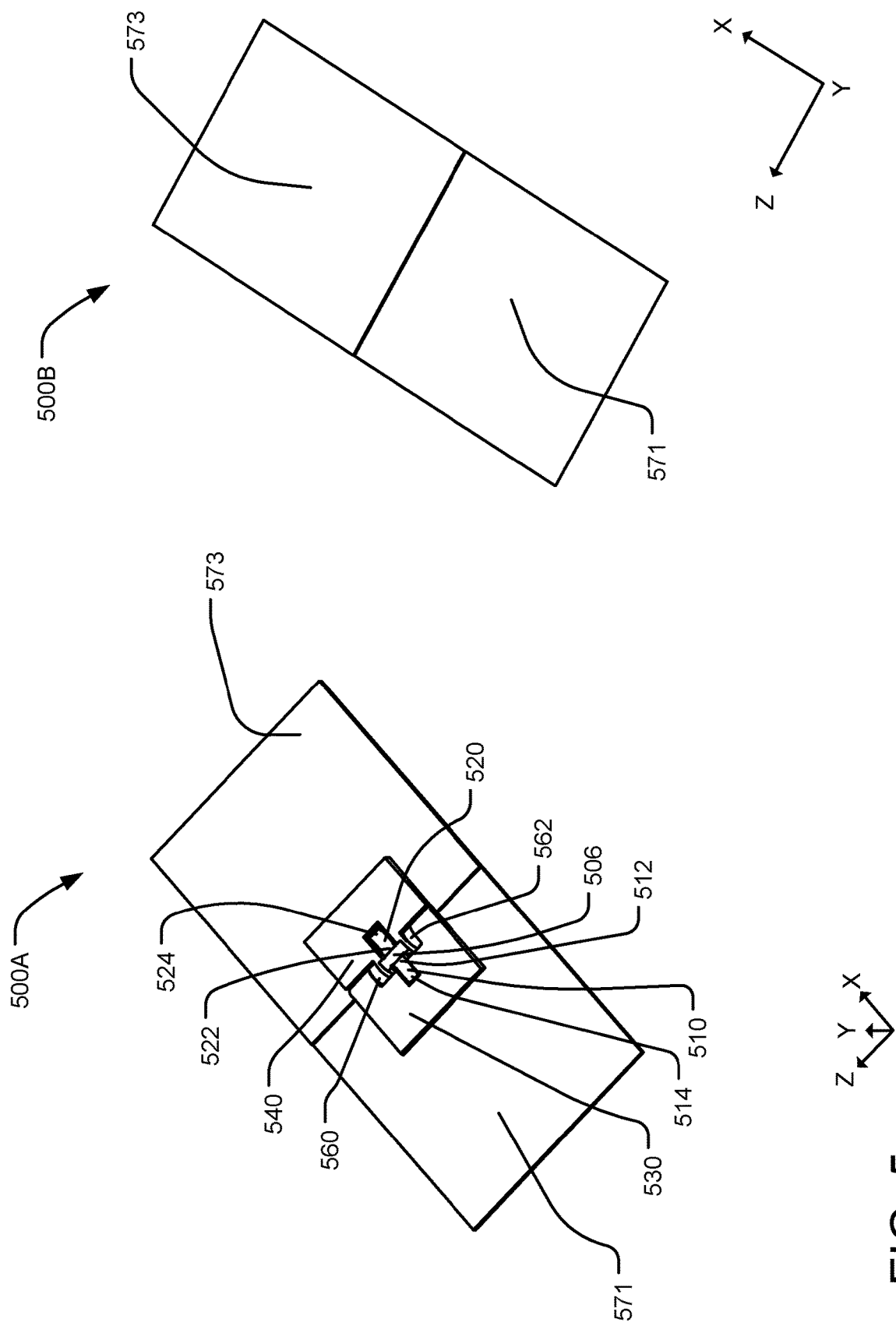
FIG. 5 illustrates an elevated view of an example hinge device system with surface panels in an open configuration.

FIG. 5 illustrates an elevated view of an example hinge device system 500A, 500B with surface panels 571, 573 in an open configuration. Hinge device system 500B may illustrate a reverse side of hinge device system 500A. As illustrated, in the open configuration, hinge device system 500B may have surface panels 571, 573 that substantially cosmetically mask any components of the hinge mechanism that would be visible, which may also present no or a limited gap between the surface panels 571, 573. The elements of one or more of panels 530, 540, bands 510, 520, rotatable couplings 512, 522, slidable couplings 514, 524, central support section 506, side support sections 560, 562, as visible in hinge device system 500A may be at least partially embedded in a case of a device to limit the visibility of the elements. This may improve the cosmetic appearance of the hinge device system 500A, 500B. In implementations, those elements and at least part of the surface panels 571, 573 are embedded in a case of a device, which may make the hinge device system appear substantially flush with a surface of the case of a device. A recess in the case of the device may be substantially conformal to the elements of hinge device system 500A to give an appearance of a flush surface of the case or may have a portion of the surface panels 571, 573 slightly above the surface of the case, such as to indicate to a user that the hinge device system 500 can provide hinge functionality (e.g., as a kickstand of a device).

In an implementation, a planar surface of the first panel 530 is longer than a planar surface of the second panel 540 (e.g., the surface excluding the central support section cradle) in a dimension and the second surface panel 573 conforms to a portion of the first panel 530 when the hinge device system 500 is in the open configuration. This overlap may not cause an issue when the second panel 540 is moved relative to the first panel 530 because a distance between the rotatable couplings 512, 522 on the central support section 506 provides accommodation for the surface panels 571, 573 between the first panel 530 and the second panel 540. The overlap may also not cause an issue, because a virtual pivot axis around which elements of hinge device system 500 rotate prevents interfering interactions between the surface panels 571, 573. In an implementation, the surface panels 571, 573 meet one another in an open configuration at a position above a central axis of one or more of the central support section 506 and side support sections 560, 562 (or a center of a portion of the sections 506, 560, 562 that is substantially planar in an open configuration).

Figure 6:
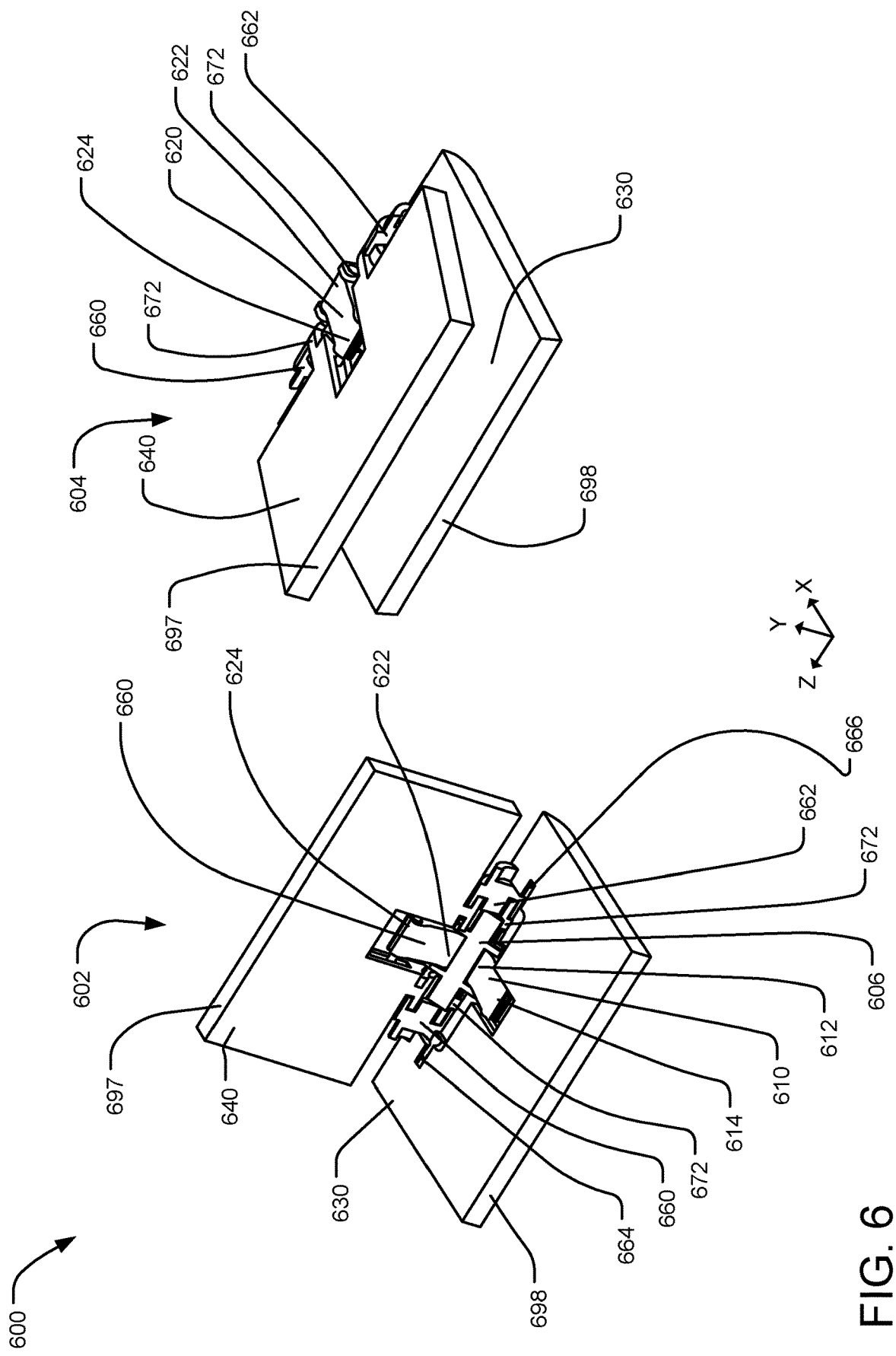
FIG. 6 illustrates perspective views of an example hinge device system in angled configurations.

FIG. 6 illustrates perspective views of an example hinge device system 600 in angled configurations. The illustrated hinge device system 600 includes a first angled configuration 602 and a second angled configuration 604. Each of the angled configurations 602, 604 can be fixed in position by friction pin elements of one or more of the rotatable couplings 612, 622 and the slidable couplings 614, 624, until sufficient force is applied to move the first panel 630 relative to the second panel 640.

In the first angled configuration 602, an interaction of the side support sections 660, 662 within channels 664, 666, respectively, is illustrated. The side support sections 660, 662 may be coupled to panels 630, 640 by slip fit between complementary portions of the side support sections 660, 662, the channels 664, 666, and a central support section cradle 672. The slip fit may be such that elements of the hinge device system 600 rotate about a virtual pivot axis.

In implementations in which the central support section 606 and the side support sections 660, 662 are not directly coupled to one another, the central support section 606 and the side support sections 660, 662 may move relatively independently of one another, except to the extent indirect couplings limit the motion. In implementations, when the panels 630, 640 are moved relative to one another, the side support sections 660, 662 move the same or a different amount on opposite sides of the central support section 606. In an implementation, the side support sections 660, 662 cannot rotate more than 90° relative to one another. In the illustrated implementation, the central support section cradle 672 is an element of the second panel 640 and moves with the second panel 640. While the panels 630, 640 may move relative to one another, the central support section 606 and side support sections 660, 662 may move differently from the panels 630, 640 and elements of the panels 630, 640. For example, the central support section cradle 672 may move differently from one or more of the central support section 606 and the side support sections 660, 662 when the panels 630, 640 move relative to one another. This relative independence of elements not directly coupled may allow for simpler manufacture and/or assembly.

In implementations, a planar surface of the first panel 630 is longer than a planar surface of the second panel 640 in a dimension, and closing the hinge device system 600 causes extension of the central support section 606 from the first panel 630 in a manner that a first distal edge 698 of the first panel 630 is substantially conformal with a second distal edge 697 of the second panel 640 in the closed configuration. Slidable couplings 614, 624 of the bands 610, 620 to the panels 630, 640 (respectively) may facilitate this extension, the slidable couplings 614, 624 may move towards a position in slots closer to the central support section 606 as the hinge device system 600 is closed. This conformity may provide a more attractive device (e.g., by elongating when moving to a close configuration and hiding elements when in an open configuration) in a closed configuration and, in the context of a support, a more versatile support (e.g., with a greater number of angles with friction resistance) with a greater range of support angles.

An example hinge device is provided. The hinge device includes a band including a first band end coupled by a slidable rotatable coupling to a first panel and a second band end coupled by a rotatable coupling to a part of a central support section and a different band including a first different band end coupled by a different slidable rotatable coupling to a second panel and a second different band end coupled by a different rotatable coupling to a different part of the central support section, wherein the central support section is configured to rotate around a virtual pivot axis parallel to each of the first panel and the second panel and located outside a surface plane of each of the first panel and the second panel.

Another example hinge device of any preceding device is provided, wherein a rotatable coupling of one or more of the rotatable coupling and the different rotatable coupling comprises a friction pin operable to provide resistance to rotation of the central support section relative to one or more of the band and the different band.

Another example hinge device of any preceding device is provided, wherein the friction pin does not rotate relative to at least one of the rotatable coupling, the different rotatable coupling, the band, and the different band.

Another example hinge device of any preceding device is provided, wherein the slidable rotatable coupling is operable to facilitate rotation of the first panel relative to the band when coupled.

Another example hinge device of any preceding device is provided, wherein the slidable rotatable coupling comprises a friction pin operable to provide resistance to rotation of the band relative to the first panel.

Another example hinge device of any preceding device is provided, wherein the slidable rotatable coupling further comprises a slot operable to allow sliding of the friction pin within the first panel, wherein the friction pin is coupled to the slot by a rotation-resistant element that resists rotation of the rotation-resistant element relative to the slot.

Another example hinge device of any preceding device is provided, wherein the central support section is not directly coupled to either of the first panel and the second panel.

Another example hinge device of any preceding device is provided, wherein the band is operable to rotate relative to the first panel about a first axis in the slidable rotatable coupling and to rotate relative to the central support section about a second axis in the rotatable coupling, wherein the different band is operable to rotate relative to the second panel about a third axis in the different slidable rotatable coupling and to rotate relative to the central support section about a fourth axis in a different rotatable coupling, and wherein the first axis, second axis, third axis, fourth axis, and virtual pivot axis are parallel to one another when the hinge device is in an open configuration.

Another example hinge device of any preceding device is provided, further comprising a first surface panel coupled to a surface of the first panel and a second surface panel coupled to a surface of the second panel, wherein the central support section includes a distance between the rotatable coupling and the different rotatable coupling, wherein the distance is greater than or substantially equal to a combined thickness of the first surface panel and the second surface panel.

An example hinge device is provided. The hinge device includes a band including a first band end coupled by a slidable rotatable coupling to a first panel and a second band end coupled by a rotatable coupling to a part of a central support section, a different band including a first different band end coupled by a different slidable rotatable coupling to a second panel and a second different band end coupled by a different rotatable coupling to a different part of the central support section, a first side support section, and a second side support section, wherein the first side support section and the second side support section are operable to couple the first panel to the second panel by slip fit on opposing sides of the central support section, wherein the first side support section, the second side support section, and the central support section are operable to rotate about a virtual pivot axis.

Another example hinge device of any preceding device is provided, the second panel further including a cradle to support a portion of the central support section, wherein the first side support section and the second side support section are coupled to the second panel by cradle conformal elements of the cradle.

Another example hinge device of any preceding device is provided, the first panel further comprising first panel conformal elements operable to couple the first panel to each of the first side support section and the second side support section, wherein a side of each of the first side support section and the second side support section to which the first panel is coupled is opposite a side of the each of the first side support section and the second side support section to which the second panel is coupled.

Another example hinge device of any preceding device is provided, wherein the cradle conformal elements and the first panel conformal elements define a track that causes the first side support section and the second side support section to rotate about the virtual pivot axis when moving the first panel relative to the second panel.

Another example hinge device of any preceding device is provided, wherein the virtual pivot axis is not inside of a physical component of the hinge device.

Another example hinge device of any preceding device is provided, further including a first surface panel coupled to a surface of the first panel and a second surface panel coupled to a surface of the second panel, wherein the first surface panel is adapted to rotate relative to the second surface panel substantially about the virtual pivot axis.

Another example hinge device of any preceding device is provided, wherein a planar surface of the first panel and a planar surface of the second panel are substantially in a same plane in an open configuration of the hinge device.

Another example hinge device of any preceding device is provided, wherein a planar surface of the central support section, a planar surface of the first side support section, and a planar surface of the second side support section are in substantially the same plane in the open configuration.

Another example hinge device of any preceding device is provided, wherein the first panel is longer than the second panel in a dimension, and wherein a distal edge of the first panel substantially conforms with a distal edge of the second panel in the dimension when the hinge device is in a closed configuration.

Another example hinge device of any preceding device is provided, wherein the slidable rotatable coupling and the different slidable rotatable coupling comprise slots and pins that slide in the slots, and wherein the pins are in positions in slots closer to the central support section when the hinge device is in a closed or angled configuration than in an open configuration.

Another example hinge device of any preceding device is provided, wherein the hinge device is an element of a supportive stand.

In implementations, any of hinge device systems 100A, 100B, 200, 300, 400A, 400B, 500A, 500B, and 600 may be implementations of one or more of the others or may share one or more features with the others. While this specification contains many specific implementation details, these should not be construed as limitations on the scope of any inventions or of what may be claimed, but rather as descriptions of features specific to particular implementations of the particular described technology. Certain features that are described in this specification in the context of separate implementations can also be implemented in combination in a single implementation. Conversely, various features that are described in the context of a single implementation can also be implemented in multiple implementations separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination. Although illustrated as having certain absolute and/or relative dimensions, angles, orientations, the dimensions, angles, and orientations are merely demonstrative and may be unrepresentative but shown as illustrated for the purpose of demonstration. Different dimensions, angles, and orientations, are contemplated, including ones described in this specification and ones known to or discernable by a person skilled in the art.

The logical operations making up implementations of the invention described herein may be referred to variously as operations, steps, objects, or modules. Furthermore, it should be understood that logical operations may be performed in any order, adding or omitting operations as desired, regardless of whether operations are labeled or identified as optional, unless explicitly claimed otherwise or a specific order is inherently necessitated by the claim language.

Thus, particular implementations of the subject matter have been described. Other implementations are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

A number of implementations of the described technology have been described. Nevertheless, it will be understood that various modifications can be made without departing from the spirit and scope of the recited claims.

What is claimed is:

1. A hinge device, comprising:
   a central support section;
   a first panel including a central support section cradle in which a portion of the central support section is positioned;
   a band including a first band end coupled by a slidable rotatable coupling to the first panel and a second band end coupled by a rotatable coupling to a part of the central support section; and
   a different band including a first different band end coupled by a different slidable rotatable coupling to a second panel and a second different band end coupled by a different rotatable coupling to a different part of the central support section,
   wherein the central support section is configured to rotate within the central support section cradle and around a virtual pivot axis parallel to surfaces of each of the first panel and the second panel and located outside a surface plane of each of the first panel and the second panel.

2. The hinge device of claim 1, wherein one or more of the rotatable coupling and the different rotatable coupling comprises:
   a friction pin operable to provide resistance to rotation of the central support section relative to one or more of the band and the different band.

3. The hinge device of claim 2, wherein the friction pin does not rotate relative to at least one of the rotatable coupling, the different rotatable coupling, the band, and the different band.

4. The hinge device of claim 1, wherein the slidable rotatable coupling is operable to facilitate rotation of the first panel relative to the band when coupled.

5. The hinge device of claim 4, wherein the slidable rotatable coupling comprises:
   a friction pin operable to provide resistance to rotation of the band relative to the first panel.

6. The hinge device of claim 5, wherein the slidable rotatable coupling further comprises:
   a slot operable to allow sliding of the friction pin within the first panel, wherein the friction pin is coupled to the slot by a rotation-resistant element that resists rotation of the rotation-resistant element relative to the slot.

7. The hinge device of claim 1, wherein the central support section is not directly coupled to either of the first panel and the second panel.

8. The hinge device of claim 1, wherein the band is operable to rotate relative to the first panel about a first axis in the slidable rotatable coupling and to rotate relative to the central support section about a second axis in the rotatable coupling, wherein the different band is operable to rotate relative to the second panel about a third axis in the different slidable rotatable coupling and to rotate relative to the central support section about a fourth axis in a different rotatable coupling, and wherein the first axis, the second axis, the third axis, the fourth axis, and the virtual pivot axis are parallel to one another when the hinge device is in an open configuration.

9. The hinge device of claim 8, further comprising:
   a first surface panel coupled to the surface plane of the first panel; and
   a second surface panel coupled to the surface plane of the second panel,
   wherein the central support section includes a distance between the rotatable coupling and the different rotatable coupling, wherein the distance is greater than or substantially equal to a combined thickness of the first surface panel and the second surface panel.

10. A hinge device, comprising:
    a band including a first band end coupled by a slidable rotatable coupling to a first panel and a second band end coupled by a rotatable coupling to a part of a central support section;
    a different band including a first different band end coupled by a different slidable rotatable coupling to a second panel and a second different band end coupled by a different rotatable coupling to a different part of the central support section;
    a first side support section; and
    a second side support section, wherein the first side support section and the second side support section are operable to couple the first panel to the second panel by slip fit on opposing sides of the central support section, wherein the first side support section, the second side support section, and the central support section are operable to rotate about a virtual pivot axis, and wherein the first side support section is movable relative to the central support section, and
    the second panel further comprising a central support section cradle to support a portion of the central support section, wherein the first side support section and the second side support section are coupled to the second panel by cradle conformal elements of the central support section cradle.

11. The hinge device of claim 10, the first panel further comprising first panel conformal elements operable to couple the first panel to each of the first side support section and the second side support section, wherein a side of each of the first side support section and the second side support section to which the first panel is coupled is opposite a side of the each of the first side support section and the second side support section to which the second panel is coupled.

12. The hinge device of claim 10, the first panel further comprising first panel conformal elements operable to couple the first panel to each of the first side support section and the second side support section, wherein the cradle conformal elements and the first panel conformal elements define tracks that cause the first side support section and the second side support section to rotate about the virtual pivot axis when moving the first panel relative to the second panel.

13. The hinge device of claim 10, wherein the virtual pivot axis is not inside of a physical component of the hinge device.

14. The hinge device of claim 10, further comprising
a first surface panel coupled to a surface of the first panel; and
a second surface panel coupled to a surface of the second panel,
wherein the first surface panel is adapted to rotate relative to the second surface panel substantially about the virtual pivot axis.

15. The hinge device of claim 10, wherein a planar surface of the first panel and a planar surface of the second panel are substantially in a same plane in an open configuration of the hinge device.

16. The hinge device of claim 15, wherein a planar surface of the central support section, a planar surface of the first side support section, and a planar surface of the second side support section are in substantially the same plane in the open configuration.

17. The hinge device of claim 10, wherein the first panel is longer than the second panel in a dimension, and wherein a distal edge of the first panel substantially conforms with a distal edge of the second panel in the dimension when the hinge device is in a closed configuration.

18. The hinge device of claim 10, wherein the slidable rotatable coupling and the different slidable rotatable coupling comprise slots and pins that slide in the slots, and wherein the pins are in positions in slots closer to the central support section when the hinge device is in a closed or angled configuration than in an open configuration.

19. The hinge device of claim 10, wherein the hinge device is an element of a supportive stand.

20. The hinge device of claim 10, wherein a first conformal coupling between the first panel and the first side support section is closer to the central support section than a second conformal coupling between the second panel and the first side support section.

* * * * *